(12) United States Patent
Cohen et al.

(10) Patent No.: US 12,007,505 B2
(45) Date of Patent: Jun. 11, 2024

(54) PROJECTOR WITH SPATIAL LIGHT MODULATION

(71) Applicant: Magic Leap, Inc., Plantation, FL (US)

(72) Inventors: David Cohen, Nesher (IL); Assaf Pellman, Bet-Yehoshua (IL); Robert D. Tekolste, Boulder, CO (US); Shlomo Felzenshtein, Nesher (IL); Giora Yahav, Haifa (IL)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/120,903

(22) Filed: Mar. 13, 2023

(65) Prior Publication Data

US 2023/0213620 A1 Jul. 6, 2023

Related U.S. Application Data

(62) Division of application No. 17/088,495, filed on Nov. 3, 2020, now Pat. No. 11,635,492, which is a division
(Continued)

(51) Int. Cl.
*G01S 7/481* (2006.01)
*G01S 7/484* (2006.01)
*G01S 7/487* (2006.01)
*G01S 17/18* (2020.01)
*G01S 17/894* (2020.01)
(Continued)

(52) U.S. Cl.
CPC .......... *G01S 7/4815* (2013.01); *G01S 7/484* (2013.01); *G01S 7/4876* (2013.01); *G01S 17/18* (2020.01); *G01S 17/894* (2020.01); *G02B 19/0009* (2013.01); *G02B 27/425* (2013.01); *G06T 7/521* (2017.01); *H04N 23/56* (2023.01); *G02B 19/009* (2013.01); *G06T 2207/10028* (2013.01)

(58) Field of Classification Search
None
See application file for complete search history.

(56) References Cited

U.S. PATENT DOCUMENTS 6,763,133 B1 7/2004 Park et al.
8,836,922 B1 9/2014 Pennecot et al.
(Continued)

FOREIGN PATENT DOCUMENTS

AU 2017336066 A1 4/2019
CA 3037058 A1 4/2018
(Continued)

OTHER PUBLICATIONS

U.S. Appl. No. 15/721,232 , "Non-Final Office Action", dated Mar. 25, 2020, 8 pages.
(Continued)

*Primary Examiner* — Eric L Bolda
(74) *Attorney, Agent, or Firm* — KILPATRICK TOWNSEND & STOCKTON LLP

(57) ABSTRACT

A time of flight based depth detection system is disclosed that includes a projector configured to sequentially emit multiple complementary illumination patterns. A sensor of the depth detection system is configured to capture the light from the illumination patterns reflecting off objects within the sensor's field of view. The data captured by the sensor can be used to filter out erroneous readings caused by light reflecting off multiple surfaces prior to returning to the sensor.

8 Claims, 15 Drawing Sheets

Related U.S. Application Data of application No. 15/721,232, filed on Sep. 29, 2017, now Pat. No. 10,859,676.

(60) Provisional application No. 62/402,871, filed on Sep. 30, 2016.

(51) Int. Cl.
| | |
|---|---|
| *G02B 19/00* | (2006.01) |
| *G02B 27/42* | (2006.01) |
| *G06T 7/521* | (2017.01) |
| *H04N 23/56* | (2023.01) |

(56) References Cited

U.S. PATENT DOCUMENTS

| | | | |
|---|---|---|---|
| 9,157,790 | B2 | 10/2015 | Shpunt et al. |
| 10,859,676 | B2 | 12/2020 | Cohen et al. |
| 11,635,492 | B2 | 4/2023 | Cohen et al. |
| 2002/0163573 | A1 | 11/2002 | Bieman et al. |
| 2007/0181810 | A1 | 8/2007 | Tan et al. |
| 2010/0008588 | A1 | 1/2010 | Feldkhun et al. |
| 2011/0169915 | A1 | 7/2011 | Bloom et al. |
| 2013/0016203 | A1 | 1/2013 | Saylor et al. |
| 2013/0206967 | A1 | 8/2013 | Shpunt et al. |
| 2014/0347443 | A1 | 11/2014 | Cohen et al. |
| 2014/0376092 | A1 | 12/2014 | Mor |
| 2015/0097947 | A1 | 4/2015 | Hudman et al. |
| 2015/0253429 | A1 | 9/2015 | Dorrington et al. |
| 2015/0373322 | A1 | 12/2015 | Goma et al. |
| 2016/0245920 | A1 | 8/2016 | Boufounos et al. |
| 2016/0286202 | A1 | 9/2016 | Romano et al. |
| 2017/0051876 | A1 | 2/2017 | Chern et al. |
| 2017/0115497 | A1 | 4/2017 | Chen et al. |
| 2017/0212220 | A1 | 7/2017 | Dahlmann |
| 2018/0095165 | A1 | 4/2018 | Cohen et al. |
| 2018/0284236 | A1 | 10/2018 | Schwarz et al. |
| 2019/0049097 | A1 | 2/2019 | Rossi et al. |
| 2021/0116546 | A1 | 4/2021 | Cohen et al. |

FOREIGN PATENT DOCUMENTS

| | | |
|---|---|---|
| CN | 104583804 A | 4/2015 |
| CN | 105100638 A | 11/2015 |
| CN | 109791201 A | 5/2019 |
| EP | 3519850 A1 | 8/2019 |
| JP | 0773502 A | 3/1995 |
| JP | 2001133231 A | 5/2001 |
| JP | 2004096457 A | 3/2004 |
| JP | 2006284573 A | 10/2006 |
| JP | 2011160420 A | 8/2011 |
| JP | 2015514965 A | 5/2015 |
| JP | 2019529924 A | 10/2019 |
| KR | 20190055230 A | 5/2019 |
| TW | 520148 U | 2/2003 |
| WO | 2018064520 A1 | 4/2018 |

OTHER PUBLICATIONS

U.S. Appl. No. 15/721,232, "Notice of Allowance", dated Aug. 3, 2020, 7 pages.

U.S. Appl. No. 17/088,495, "Notice of Allowance", dated Dec. 14, 2022, 8 pages.

Application No. AU2017336066, "First Examination Report", dated Jul. 12, 2021, 4 pages.

Application No. AU2017336066, "Notice of Acceptance", dated Apr. 1, 2022, 3 pages.

Application No. AU2017336066, "Second Examination Report", dated Jan. 4, 2022, 3 pages.

Application No. CN201780060530.7, "Office Action" and English translation, dated Aug. 22, 2022, 23 pages.

Application No. EP17857523.9, "Extended European Search Report", dated Sep. 16, 2019, 8 pages.

Application No. EP17857523.9, "Office Action", dated Oct. 8, 2021, 5 pages.

Application No. IL265660, "Office Action" and English translation, dated Nov. 18, 2021, 6 pages.

Application No. IN201947010280, "First Examination Report", dated May 28, 2021, 6 pages.

Application No. JP2019-516929, "Office Action" and English translation, dated May 31, 2021, 8 pages.

Application No. JP2021-208192, "Office Action", dated Feb. 27, 2023, 1 page.[no translation available].

Application No. KR10-2019-7012447, "Notice of Decision to Grant" and English translation, dated Jul. 12, 2022, 3 pages.

Application No. KR10-2019-7012447, "Office Action" and English translation, dated Jan. 24, 2022, 18 pages.

PCT/US2017/054385, "International Preliminary Report on Patentability", dated Apr. 11, 2019, 10 pages.

PCT/US2017/054385, "International Search Report and Written Opinion", dated Dec. 1, 2017, 14 pages.

Japanese Patent Application No. 2021-208192, "Office Action" and English translation, dated Aug. 31, 2023, 9 pages.

Illumination Pattern A

Illumination Pattern B

Illumination Pattern C

Illumination Pattern D

PROJECTOR WITH SPATIAL LIGHT MODULATION

CROSS-REFERENCE TO RELATED APPLICATIONS

This application is a divisional of U.S. patent application Ser. No. 17/088,495, filed on Nov. 3, 2020, entitled "PROJECTOR WITH SPATIAL LIGHT MODULATION," which is a divisional of U.S. patent application Ser. No. 15/721,232, filed on Sep. 29, 2017, U.S. Pat. No. 10,859,676, issued on Dec. 8, 2020, entitled "PROJECTOR WITH SPATIAL LIGHT MODULATION," which is a non-provisional of and claims the benefit of and priority to U.S. Provisional Patent Application No. 62/402,871, filed on Sep. 30, 2016, entitled "PROJECTOR WITH SPATIAL LIGHT MODULATION," which are hereby incorporated by reference in their entirety for all purposes.

BACKGROUND OF THE INVENTION

Numerous techniques exist for range imaging, which can be quite useful in multiple different applications. One specific type of range imaging can be performed using a time of flight camera. The time of flight camera can measure the time it takes for a pulse of light to travel to and from objects in the sensor's field of view to determine the distance between the sensor and the objects in the sensor's field of view. Unfortunately, light emitted by a depth detection system may not always travel directly to an object within the sensor field of view and back to the sensor. If the light bounces off another object before reflecting off the object, the time taken for the light to return to the sensor is increased, thereby increasing the measured time of flight for a reflected pulse of light. The longer time of flight measurement can result in the depth detection system erroneously increasing the measured distance between the sensor and the object. Consequently, a way of fixing this error is desirable.

SUMMARY OF THE INVENTION

This disclosure describes a time of flight camera configured to filter out erroneous readings resulting from pulses of light bouncing off multiple surfaces.

This disclosure relates to ways of improving performance of a depth detection system. The depth detection system can be configured to sequentially emit complementary illumination patterns onto a region being monitored by an imaging sensor of the depth detection system. The imaging sensor can act as a time of flight sensor to determine a distance between the depth detection system and objects within the region by measuring the time it takes for light forming the illumination patterns to reflect off the objects and return to the imaging sensor. Some of the light received at the imaging sensor can be indirect light that bounces off other surfaces before arriving at the imaging sensor. This can be especially problematic in room corners where more indirect light is likely to return to the imaging sensor. The reflections increase the amount of time it takes for the light to return to the imaging sensor, thereby reducing the accuracy of the sensor data. Some of this indirect light can be filtered out from consideration by the depth detection system by identifying light reflecting off portions of the region being monitored by the imaging sensor falling outside of a first illumination pattern when the first illumination pattern is active. This identified light can then be subtracted out of consideration when the second illumination pattern is active. Similarly, light falling outside of the second illumination pattern when the second illumination pattern is active can be subtracted from the first illumination pattern. In this way, more accurate depth detection information can be obtained.

Light sources that emit the complementary illumination patterns can be mounted to a common substrate to prevent the light sources from being out of alignment from one another. The common substrate can also help reduce any thermal effects that would result in the light sources being thrown out of alignment.

A depth detection system is disclosed and includes at least the following: a projection system, comprising: a projector housing having a rigid substrate, a first light source configured to emit light through a first plurality of light shaping components, the first light source being mounted to the rigid substrate, and a second light source configured to emit light through a second plurality of light shaping components, the second light source being mounted to the rigid substrate adjacent to the first light source; an imaging sensor proximate the projection system and configured to receive light emitted by the first and second light sources after being reflected off objects within a field of view of the imaging sensor; and a processor configured to calculate a distance between the depth detection system and the objects within the sensor field of view by measuring an amount of time for light emitted by the first and second light sources to reflect off the objects within the sensor field of view and return to the imaging sensor.

Another depth detection system is disclosed and includes the following: a plurality of light shaping components, comprising: a collimating optical element, a refractive optical element, a diffractive optical element, and a micro-lens array; a light source configured to emit light through the plurality of light shaping components; an imaging sensor configured to detect light emitted by the light source and reflected off objects within a field of view of the imaging sensor; and a processor configured to determine a distance between the depth detection system and the objects by filtering out sensor readings associated with light reflected off surfaces outside the field of view of the imaging sensor.

A depth detection system is disclosed and includes the following: a projection system, comprising: a projector housing having a rigid substrate, a first light source configured to emit light through a first plurality of light shaping components and produce a first illumination pattern, the first light source being mounted to the rigid substrate, and a second light source configured to emit light through a second plurality of light shaping components and produce a second illumination pattern complementary to the first illumination pattern, the second light source being mounted to the rigid substrate adjacent to the first light source; an imaging sensor proximate the projection system and configured to receive light emitted by the first and second light sources after being reflected off objects within a field of view of the imaging sensor; and a processor configured to calculate a distance between the depth detection system and the objects within the sensor field of view by measuring an amount of time for light emitted by the first and second light sources to reflect off the objects within the sensor field of view and return to the imaging sensor and filtering out sensor readings associated with light reflected off surfaces outside the field of view of the imaging sensor.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION OF SPECIFIC EMBODIMENTS

Figure 1A:
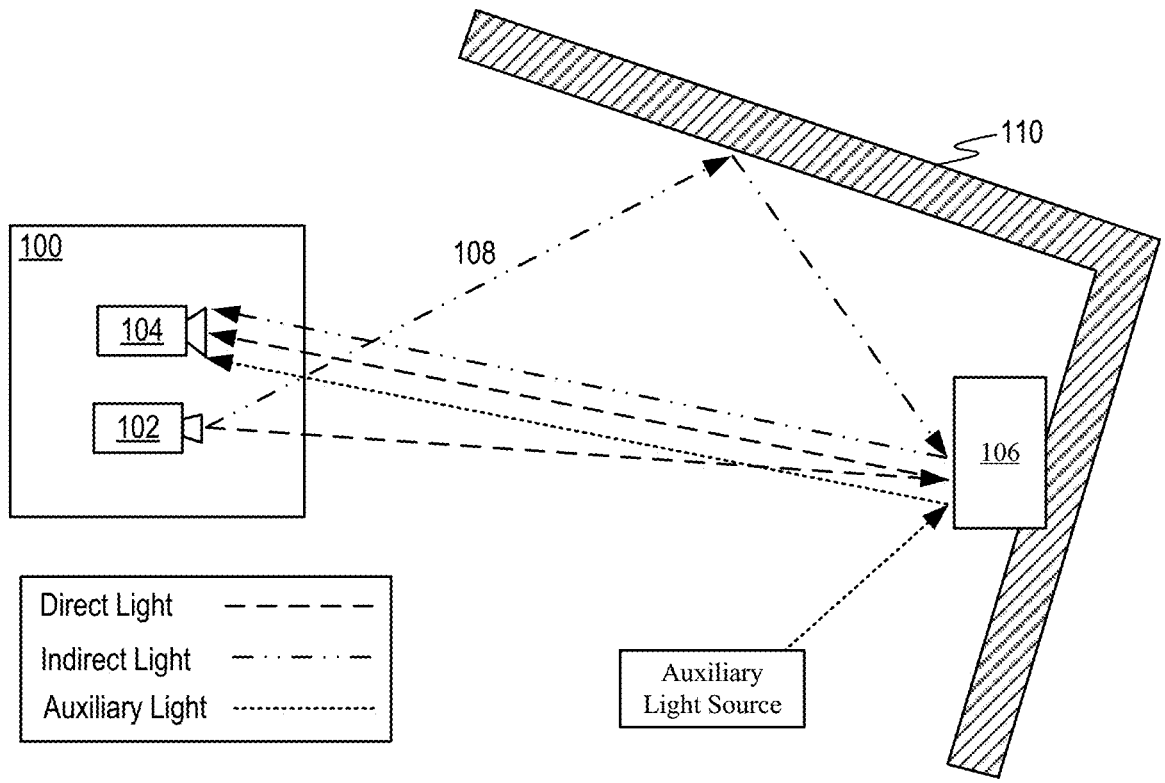
FIG. 1A shows an exemplary depth detection sensor in use.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

A depth detection system can be configured to characterize an environment within a field of view of the depth detection system. The resulting characterization can be used to determine a position and exterior shape of portions of objects facing the depth detection system. One type of depth detection system is a time of flight (TOF) camera. A TOF camera utilizes a projector for emitting modulated pulses of light and a sensor for receiving a portion of each of the pulses of light that reflects off the various objects within the sensor's field of view. A processor receiving readings from the sensor can determine the time taken for the light to travel from the sensor and bounce off one of the objects in the field of view and return to the sensor. Because the speed of light is known, the system can determine the distance between the depth detection sensor and the object based on that time. Unfortunately, while this method works well for determining distance when the light bounces off an object and returns directly back to the sensor, any light returning to the sensor that bounces off another object first can cause inaccuracies in the depth data.

One solution to this problem is to filter out indirectly reflected light received at the sensor to reduce inaccuracies. One way this can be accomplished is to adjust the manner in which the environment is illuminated with light. The light can be emitted by a projection system in alternating illumination patterns to sequentially illuminate different portions of the objects in the field of view. In some embodiments, the illumination pattern can be arranged in substantially parallel stripes, although different patterns are also possible. Each of the stripes can be separated by a gap having about the same thickness as each stripe. In this way, about half of the field of view can be illuminated any time an illumination pattern is emitted. It should be appreciated that different stripe and gap thicknesses can be used but that at some point during a series of different illumination patterns each portion of the field of view should be unilluminated. Any light returning from areas of the frame that should not be illuminated by a particular pattern of light can be used to identify reflected light. When a different illumination pattern illuminates that portion of the object from which reflected light was previously detected, the reflected light can be subtracted from the detected light to identify only that portion of the light that travels directly from the projection system to the object and back to the sensor. Any other light can be ignored for the purposes of making a depth map of the area with the sensor's field of view. In this way, the accuracy of the depth data can be substantially improved.

A projection system for performing the aforementioned method can include two or more light sources for generating the illumination patterns. In some embodiments, the projection system can be configured to operate very quickly in order to keep up with changing conditions. For example, in some embodiments, the light sources can be configured to emit more than 100 pulses per second. A sensor associated with the projection system can be configured to capture the light as it comes back and can have a global shutter that allows each of the pixels of the sensor to be read at the same time. In this way, any errors introduced due to sequentially reading the pixels can be avoided.

In some embodiments, the light sources can be incorporated within a single projector housing. Packaging the light sources in a single projector prevents the situation where one of two or more separate projection units gets bumped or jostled a different amount than the other units, which results in misalignment of the illumination patterns. While a slight change in alignment of a single projector configured to project multiple illumination patterns could result in a portion of the sensor field of view not being covered by the illumination pattern, the majority of the sensor field of view could remain covered without compromising alignment of the illumination patterns. In some embodiments, a single projector housing can include a unitary rigid substrate with a low coefficient of thermal expansion that keeps the separation between the light sources consistent over a large range of temperatures. Each of the light sources can have different optics that direct the light into the various illumination patterns. In some embodiments, a projection system with a single light source can be used that has shifting optics. In such an embodiment, the optics can oscillate between two or more positions to create two or more illumination patterns from the single light source.

These and other embodiments are discussed below with reference to FIGS. 1A-7; however, those skilled in the art will readily appreciate that the detailed description given herein with respect to these figures is for explanatory purposes only and should not be construed as limiting.

FIG. 1A shows an exemplary depth detection system 100 in use. Depth detection system 100 includes a projection system 102 and a sensor 104. Projection system 102 can be configured to emit light towards an object 106. In some embodiments, the light emitted by projection system 102 can be infrared light or near infrared light. Since the light emitted by projection system 102 can be configured to cover a broad area corresponding to a field of view of sensor 104, exemplary light wave 108 can bounce off of wall 110 and due to the angle of wall 110 light wave 108 can instead of reflecting back from wall 110 bounce off object 106 and then back to sensor 104 as depicted. This can be particularly problematic when object 106 has irregular surfaces (i.e. curved or cylindrical surfaces) that scatter light incident to object 106. The scattering of the reflected light increases the likelihood of the reflected light arriving back at sensor 104 as depicted.

Figure 1B:
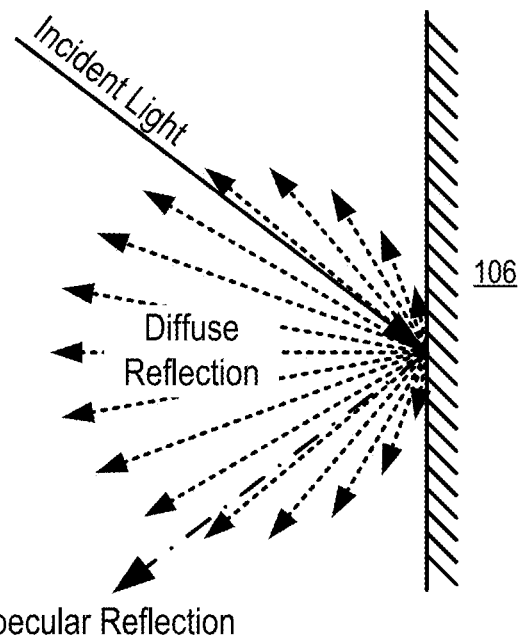
FIG. 1B shows how light incident to an object can be reflected by diffuse and/or specular reflection according to some embodiments.

FIG. 1B shows how light incident to object 106 can be reflected by diffuse and/or specular reflection. While a flat surface is generally needed to generate specular reflection, a flat surface also tends to generate some diffuse reflection on account of scattering centers located below the surface of object 106. Curved or varied surfaces generate even more diffuse reflections that scatter in many directions. One of the reasons the light reflected off wall 110 can be hard to distinguish from the direct light is that when the surface of wall 110 is relatively flat, a substantial amount of light wave 108 can be reflected as specular reflection from wall 110, thereby causing the resulting diffuse reflection at object 106 from light wave 108 to have a similar intensity as the diffuse reflection at object 106 originating from light wave 112. It should be noted that light going from the projector to object 106 and then bouncing off wall 110 back towards the sensor is not considered to be a problem where wall 110 is not in the sensor field of view. In such a case, the high angle of incidence of the light entering the sensor would not be detected by the sensor on account of the sensor only being configured to receive light arriving from a particular field of view. The high angle of incidence light can be prevented from reaching the sensor using a shroud or light gathering lens positioned over the sensor.

Figure 1C:
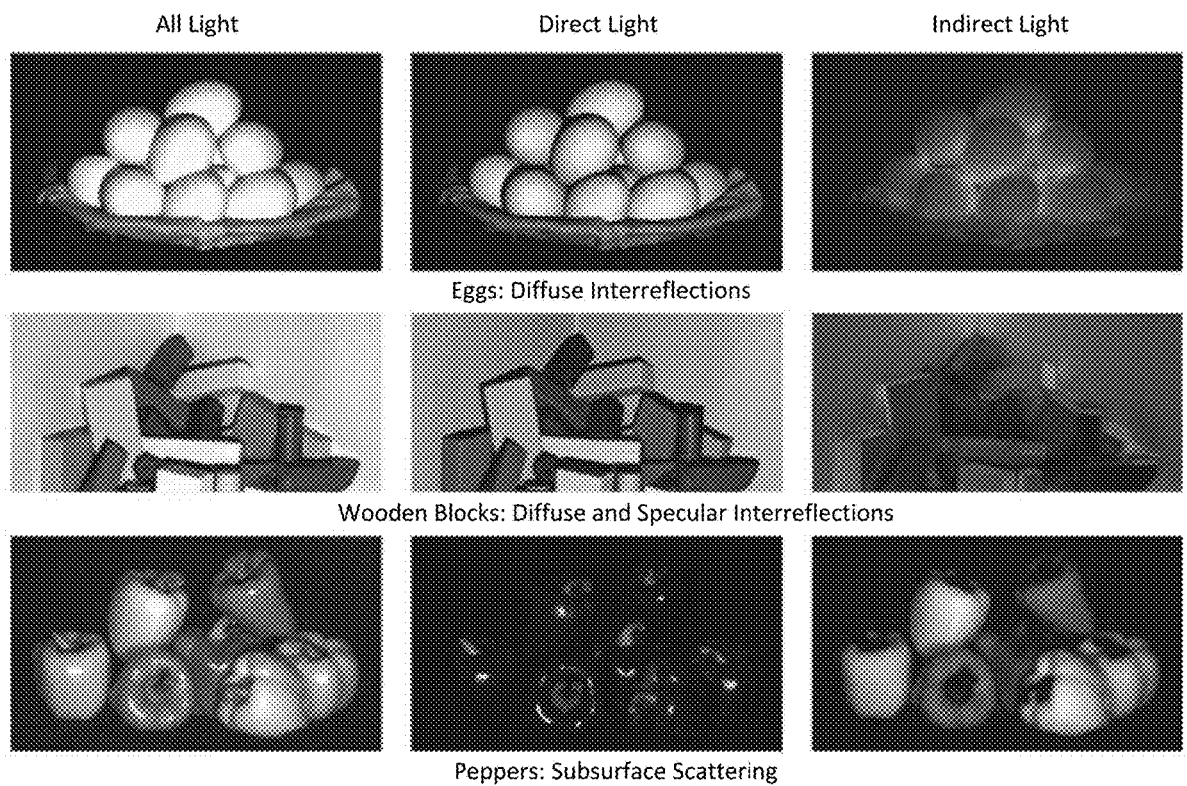
FIG. 1C shows examples of different types of objects illuminated by a projection system according to some embodiments.

FIG. 1C shows examples of different types of objects illuminated by projection system 102. The first column of images shows images generated using all of the light reflected off of the objects and captured by sensor 104. The images in the second column show only the light reflected directly off the objects. The images in the third column show only the light reflected first off other objects (indirect light) prior to hitting the object in the sensor field of view. The first row of egg pictures provide an example of diffuse interreflections. The spherical shape of the eggs accentuates the amount of diffuse reflection generated by light striking the surface of each of the eggs. In particular, the indirect light image from the first row shows how the lower edges of the eggs capture a substantial amount of indirect light and could consequently appear to be farther away from the sensor. The second row of wooden block pictures provides an example of both diffuse and specular interreflection. The flat surfaces of the wooden blocks allow for a certain amount of specular reflection while the underlying wood grain structure and corners of the blocks create diffuse interreflection. Finally the third row of peppers shows how sub-surface scattering can cause only a small amount of light to be reflected directly back to sensor 104. This limited amount of direct light can make filtering out the indirect light even more important for determining the actual distance between sensor 104 and the peppers. FIG. 1C was originally published as part of the article "Fast Separation of Direct and Global Components of a Scene using High Frequency Illumination", by Krishnan.

Figure 2A:
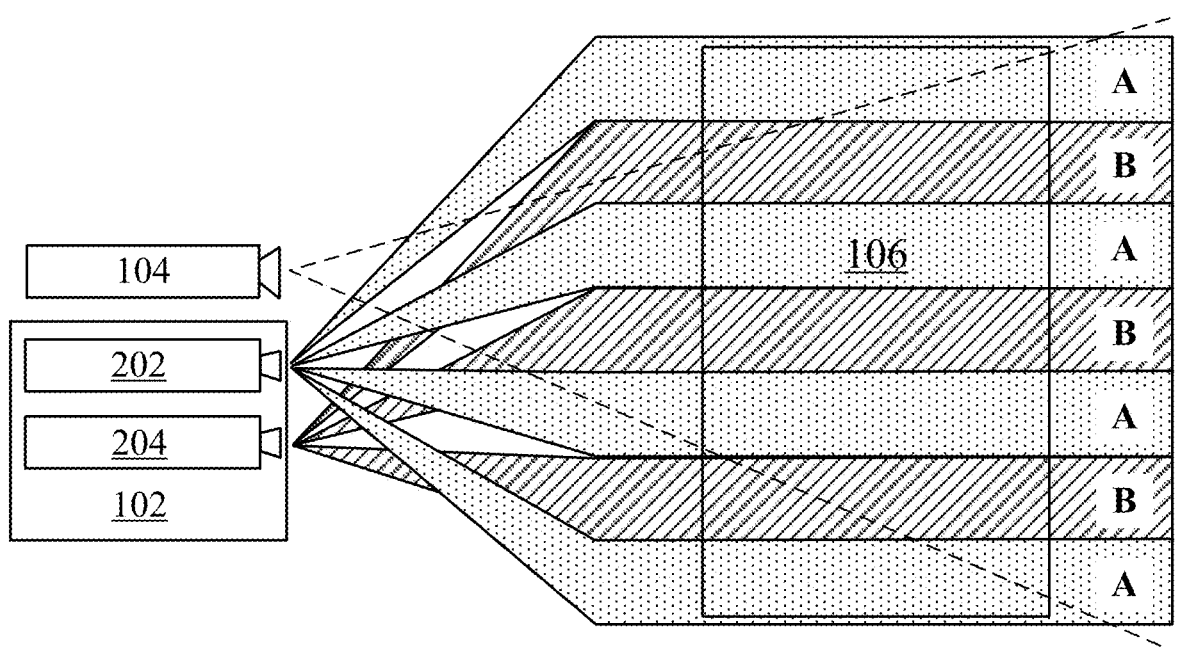
FIG. 2A shows a projection system 102, which includes two projectors according to some embodiments.

FIG. 2A shows projection system 102, which includes projectors 202 and 204. Projectors 202 and 204 can be used to emit complementary illumination patterns A & B. Illumination patterns A & B can be sequentially pulsed so that only one of the illumination patterns is active at any given time. In some embodiments, the illumination patterns can be pulsed in an alternating pattern (e.g. in an A, B, A, B pattern). The pulsed emissions can also be modulated to help distinguish the pulsed emission from other ambient light sources. Consequently, when illumination pattern A is active, any area outside of illumination pattern A should be devoid of light. However, generally a portion of illumination pattern A reflecting off other surfaces first and in certain environments other ambient light can be detected by sensor 104 reflecting off areas not being directly illuminated by illumination pattern A. This reflected light detected in the unilluminated areas of object 106 can be subsequently used to identify reflected light when illumination pattern B is active. Similarly, when illumination pattern B is active, reflected light arriving from outside of illumination pattern B can be subsequently used to identify reflected light during the next pulse of illumination pattern A. So in general, the reflected light or indirect light ($I_{INDIRECT}$) detected originating from outside of the active illumination pattern can be recorded. When the next illumination pattern activates, the previously recorded indirect light ($I_{INDIRECT}$) from the now active illumination pattern can be subtracted from all of the light ($I_{TOTAL}$) received from the active illumination pattern in accordance with Eq(1) to identify the direct light.

$$I_{DIRECT} = I_{TOTAL} - I_{INDIRECT} \qquad \text{Eq(1)}$$

It should be noted that in some embodiments, any ambient light reflecting off object 106 and back into sensor 104 can be filtered out by rejecting light not matching the modulation associated with the illumination patterns.

Figure 2B:
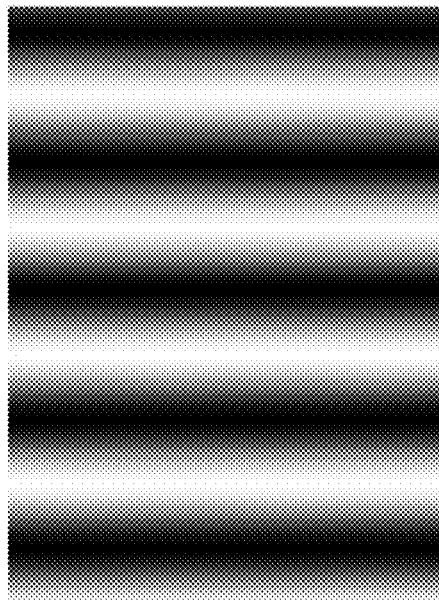
FIG. 2B shows exemplary illumination patterns A and B according to some embodiments.
Figure 2B:
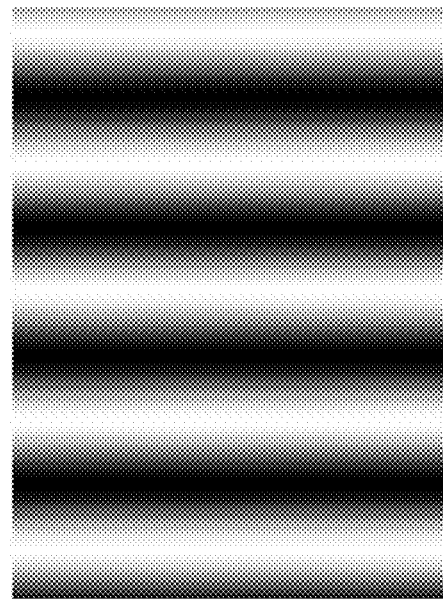
Figure 2B:
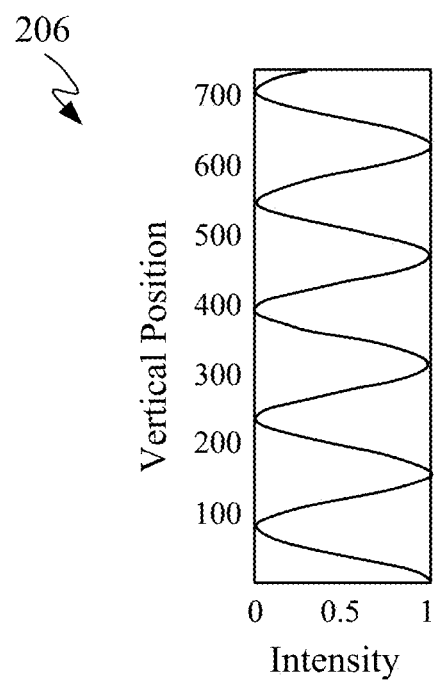
Figure 2B:
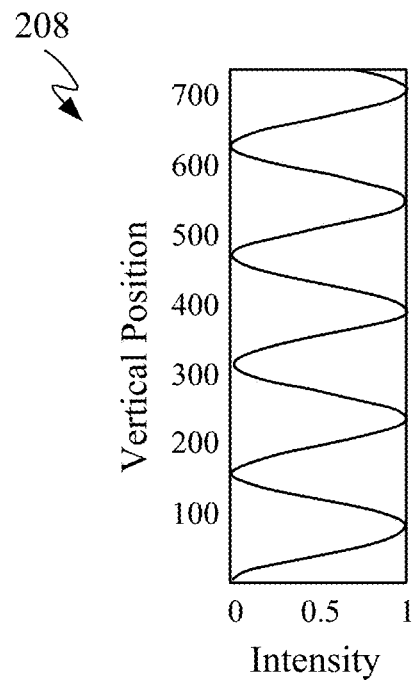

FIG. 2B shows exemplary illumination patterns A and B. The intensity of illumination patterns A and B can be distributed in a sinusoidal pattern as a function of vertical position. As depicted, illumination pattern A can be 180 degrees out of phase with illumination pattern B, resulting in illumination pattern A having a maximum intensity value when illumination pattern B is at a minimum intensity value. In this way, if the two illumination patterns were emitted simultaneously then a substantially uniform light pattern would be created. Graph 206 illustrates illumination pattern A while graph 208 illustrates illumination pattern B. Mathematically the intensity of the combined pattern would cause the intensity value to have a substantially constant value equal to 1. More generally, the illumination intensity can be modeled using Eq(2).

$$L_i = \frac{1}{2} A_0 (1 + \sin(2\pi f \beta + \phi_i)) \qquad \text{Eq(2)}$$

In Eq(2), i indicates which illumination pattern of a total of N illumination patterns is being calculated. $A_0$ is the amplitude of the illumination pattern. f is the spatial frequency of the light bars. β is the angle of the vertical field of view of the sensor. $\phi_i$ represents the shift in phase for the illumination pattern whose value is determined by Eq(3).

$$\phi_i = \frac{2\pi}{N}i \quad \text{Eq(3)}$$

Figure 2C:
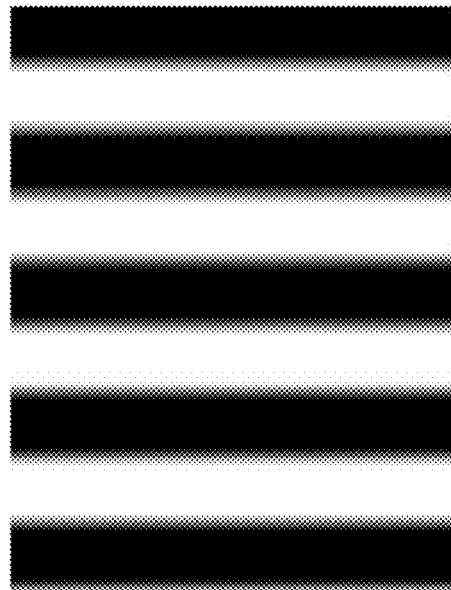
FIG. 2C shows illumination patterns C and D according to some embodiments.
Figure 2C:
Figure 2C:
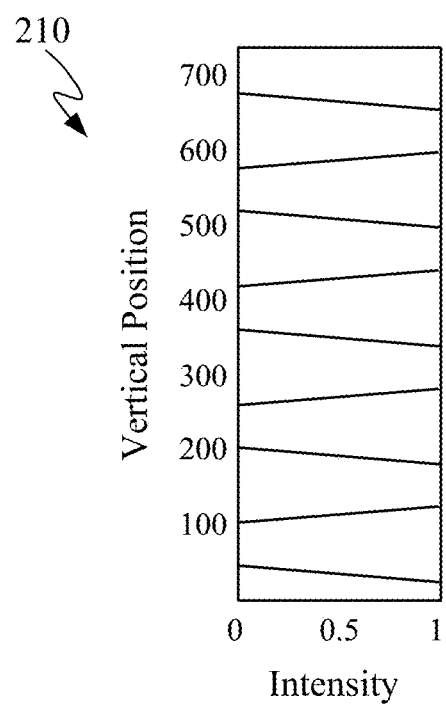
Figure 2C:
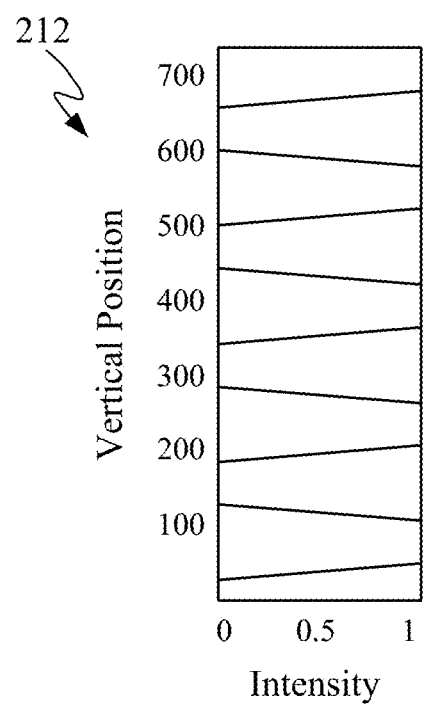

As can be appreciated, Eq(3) makes clear that the phase shift can be 180 degrees for two patterns, 120 degrees for three patterns, 90 degrees for four patterns, etc. In general, more illumination patterns can be used to achieve more accurate results. Furthermore, in some embodiments, the shift in phase can also be varied in different manners FIG. 2C shows illumination patterns C and D. The intensity profiles of illumination patterns C and D are trapezoidal instead of sinusoidal. By having rapidly rising and falling intensities, a more abrupt transition between light bars of illumination patterns C and D can be achieved. A more crisp transition can be beneficial in minimizing ambiguity when filtering the indirect light from the direct light, as will be described in greater detail below.

Figure 2D:
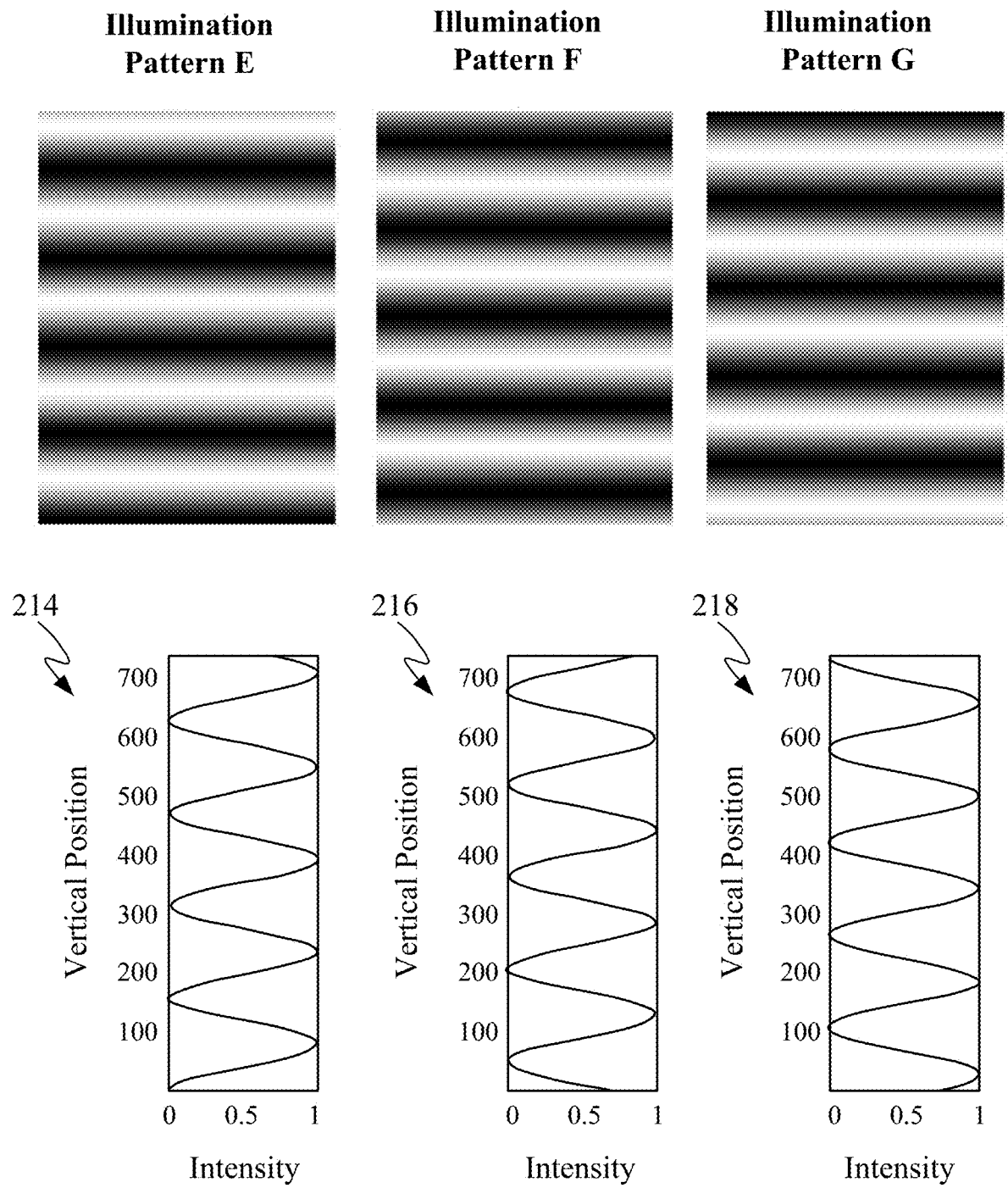
FIG. 2D shows illumination patterns E, F and G according to some embodiments.

FIG. 2D shows illumination patterns E, F and G. The intensity of illumination patterns E, F and G are distributed vertically so illumination pattern F is 120 degrees out of phase from illumination pattern E. In this way, successive light bars can be shifted vertically but without being complementary in nature. Graphs 214, 216 and 218 quantitatively show how respective illumination patterns E, F and G vary in accordance with vertical position. The third illumination pattern can be generated by a third light source or by optics that can shift to create both the second and third patterns.

Figure 2E:
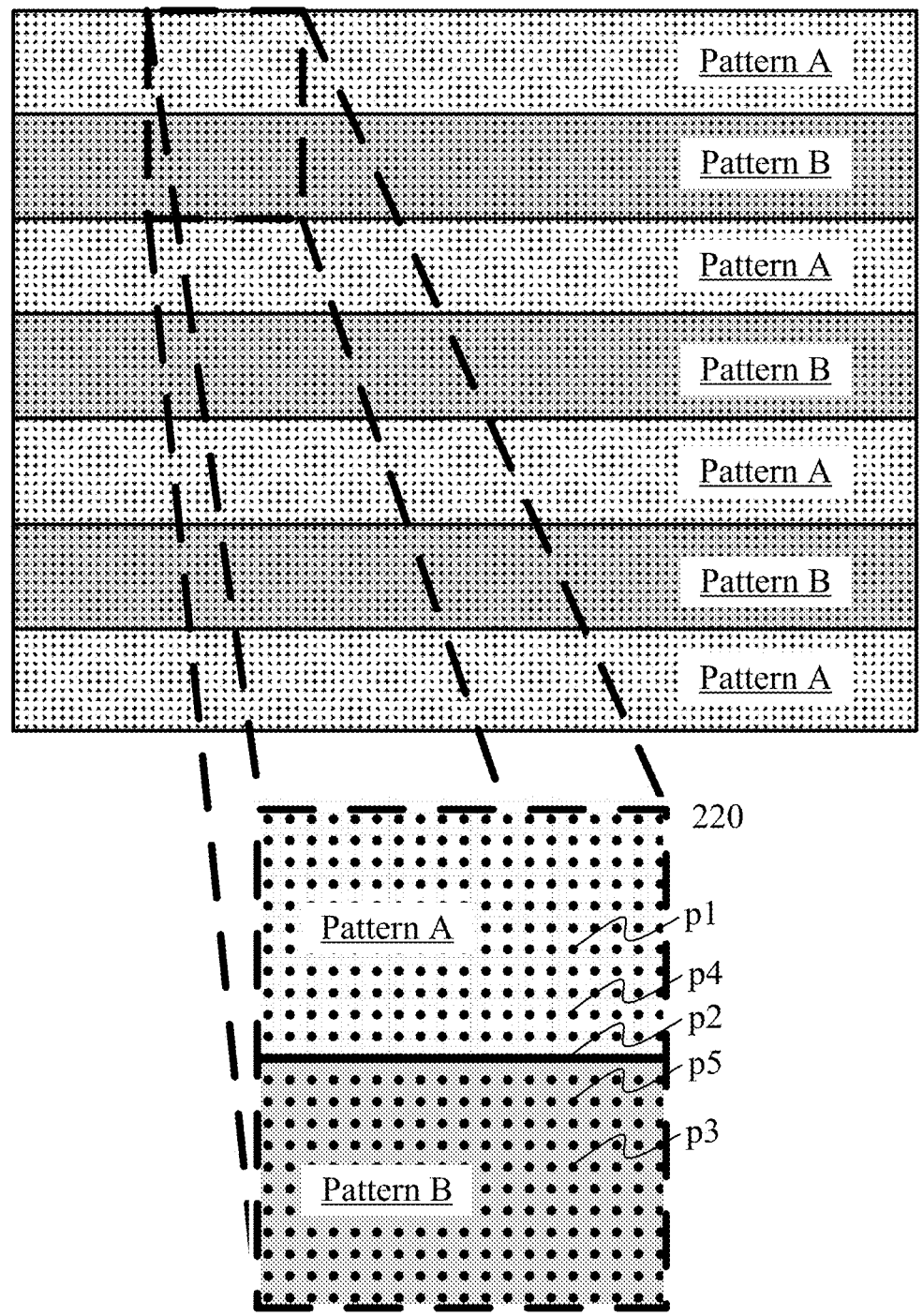
FIG. 2E shows how discrete pixels or sampling points can be distributed across multiple illumination patterns according to some embodiments.

FIG. 2E shows how discrete pixels or sampling points can be distributed across multiple illumination patterns. Close up view 220 shows three different sampling points p1, p2 and p3 distributed within illumination patterns A and B. The indirect light at each of the sampling points can be identified by performing a number of calculations for each pixel/sampling point. In particular, Eq(4) can be used to sum up the light $S_i$ collected by the sensor during each sequential illumination pattern.

$$T = \sum_{i=1}^{N} S_i \quad \text{Eq(4)}$$

Eq(5) can then be used to calculate the amount of direct light when the intensity of each illumination pattern varies sinusoidally.

$$D = \sqrt{\left[\sum_{i=1}^{N} S_i \cos(\phi_i)\right]^2 + \left[\sum_{i=1}^{N} S_i \sin(\phi_i)\right]^2} - \text{"subtracted image"} \quad \text{Eq(5)}$$

Eq(5) sums up the amplitude of each component of the light received, when each of the illumination patterns is active, in order to represent the total amount of light emitted over the span of one set of the illumination patterns. In a two illumination pattern projection system, the subtracted image represents reflected light detected from within illumination pattern A when illumination pattern B is active as well as reflected light detected from within illumination pattern B when illumination pattern A is active. By adding the two sets of reflected light together, the distribution of reflected light across the whole field of view can be determined. In general, this calculation assumes that the reflected light stays substantially the same regardless of which illumination pattern is active. Consequently, subtracting the subtracted image from the total light identifies the direct light within the field of view. Eq(6) shows how indirect light (I) can be calculated by subtracting the calculated direct light (D) from the total light (T).

$$I = T - D - \text{const}[GL] \quad \text{Eq(6)}$$

In some embodiments, const[GL] can be subtracted from the total light. This constant can be optionally used to remove grey level bias when identifying the indirect light in the sensor field of view. In some embodiments, subtracting the grey level bias out can improve the accuracy of the depth data detected by the sensor. The grey level bias can be a factory setting or a value that can be periodically calibrated to keep the depth detection system working well.

FIG. 2E also demonstrates how depth detection at position p2 can be problematic for a system with only two illumination patterns. For p1 and p3 which are situated safely away from the boundary between illumination patterns, indirect light rejection can be straight forward since there are only two illumination patterns to consider. For p1, when illumination pattern A is active the received signal is equal to the direct light+any reflected light. When illumination pattern B is active, the received signal at p1 is equal to zero direct light+any reflected light. The direct light can be calculated by taking the difference between the two signals. This yields just the direct light since the reflected light cancels out and the direct light during illumination pattern B is equal to zero. For p3, the calculation works in a similar manner, yielding just the direct light. Unfortunately, at p2, which is located on the interface precisely between the illumination patterns, direct light from both patterns A and B will be detected at about the same intensity. This means that taking the difference in values results in a zero value. Furthermore, areas near the interface will also suffer from some inaccuracies any time direct light from both illumination patterns is present in substantial amounts. Consequently, illumination patterns with sharp boundaries between the illumination patterns will have fewer inaccuracies at the interfaces between the illumination patterns. However, direct light values for points near the interface can still be calculated by interpolation. The direct light value for p3 can be calculated by interpolation from direct light values for p4 and p5. Generally, p4 and p5 should be as close as possible to p2. For example, a processor can be configured to select an interpolation point p4 with an amount of direct light from illumination pattern B that falls below a predetermined threshold.

Figure 3A:
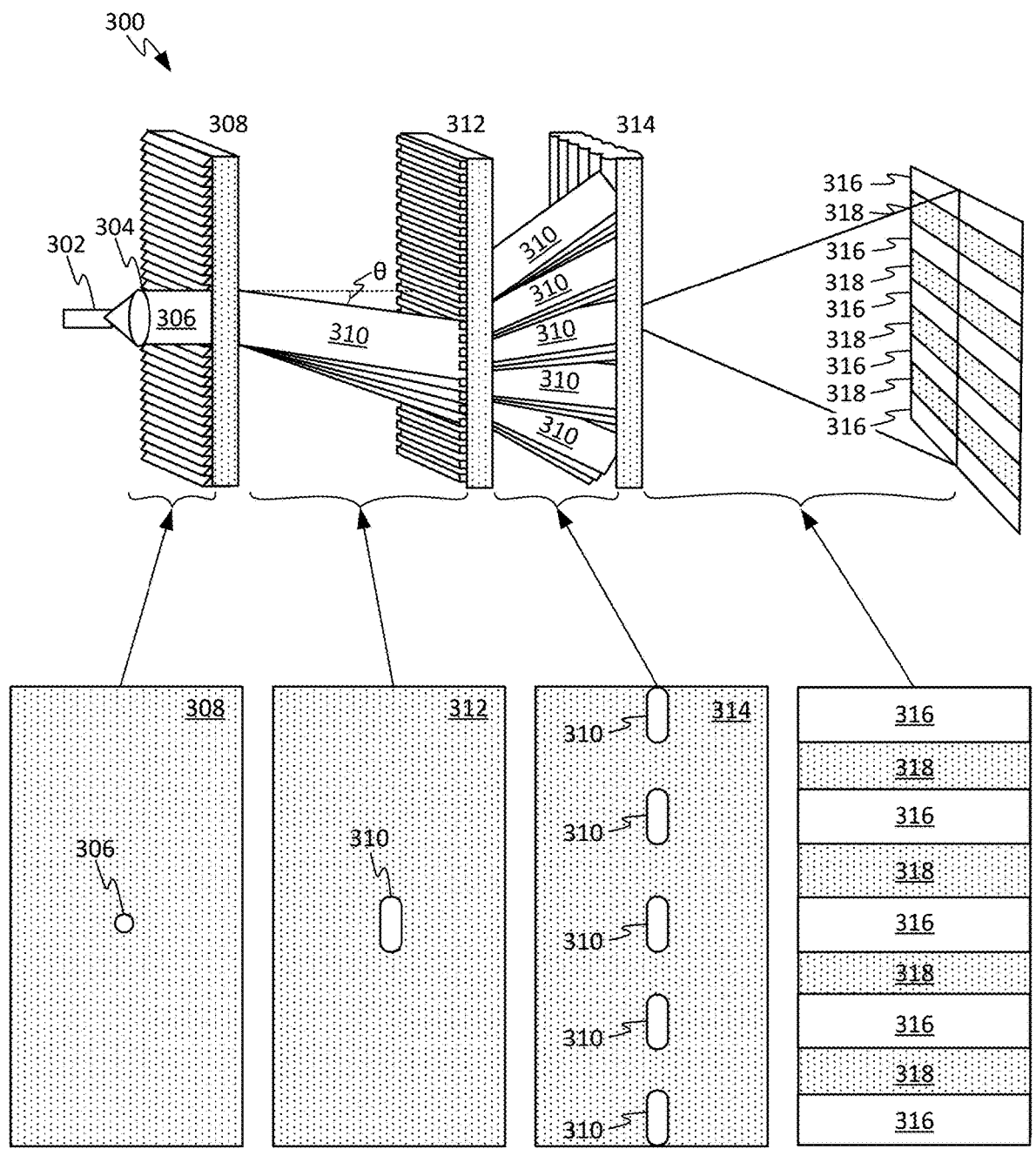
FIG. 3A-3C show various optics assembly embodiments, which are each made up of a group of light shaping components positioned in front of a light source according to some embodiments.

FIG. 3A shows a first optics assembly 300, which is made up of a group of light shaping components positioned in front of a light source 302. In some embodiments, light source 302 can be an infrared laser diode. Light source 302 emits light that passes through a first light shaping component, collimating lens 304. Collimating lens 304 can be configured to focus light 306 emitted by light source 302 towards a second light shaping component, refractive optical element 308. Refractive optical element 308 tilts focused light 306 by an angle θ and elongates the light vertically to generate a super-gaussian beam 310 that is directed at a third light shaping component, diffractive optical element 312. Diffractive optical element 312 then multiplies the super-gaussian beam 310. While super-gaussian beam 310 is depicted for illustrative purposes as being multiplied five times, this number can vary. For example, in some embodiments, diffractive optical element 312 can be configured to multiply the super-gaussian beam 25 times. The number and thickness of multiplied super-gaussian beams 310 can be selected to match the vertical field of view of an associated imaging sensor. When super-gaussian beams pass through micro-lens array 314, micro-lens array 314 spreads each super-gaussian beam horizontally to create an illumination pattern that illuminates regions 316, as depicted. Micro-lens array 314 can by dual sided (as depicted), single sided or cylindrical. In some embodiments, regions 318 and regions 316 can be about the same size. Light from a second optics assembly can be configured to illuminate regions 318. In some embodiments, the optics assemblies can emit light in complementary patterns so that one of horizontal regions 316 and 318 is illuminated at any given time.

Figure 3B:
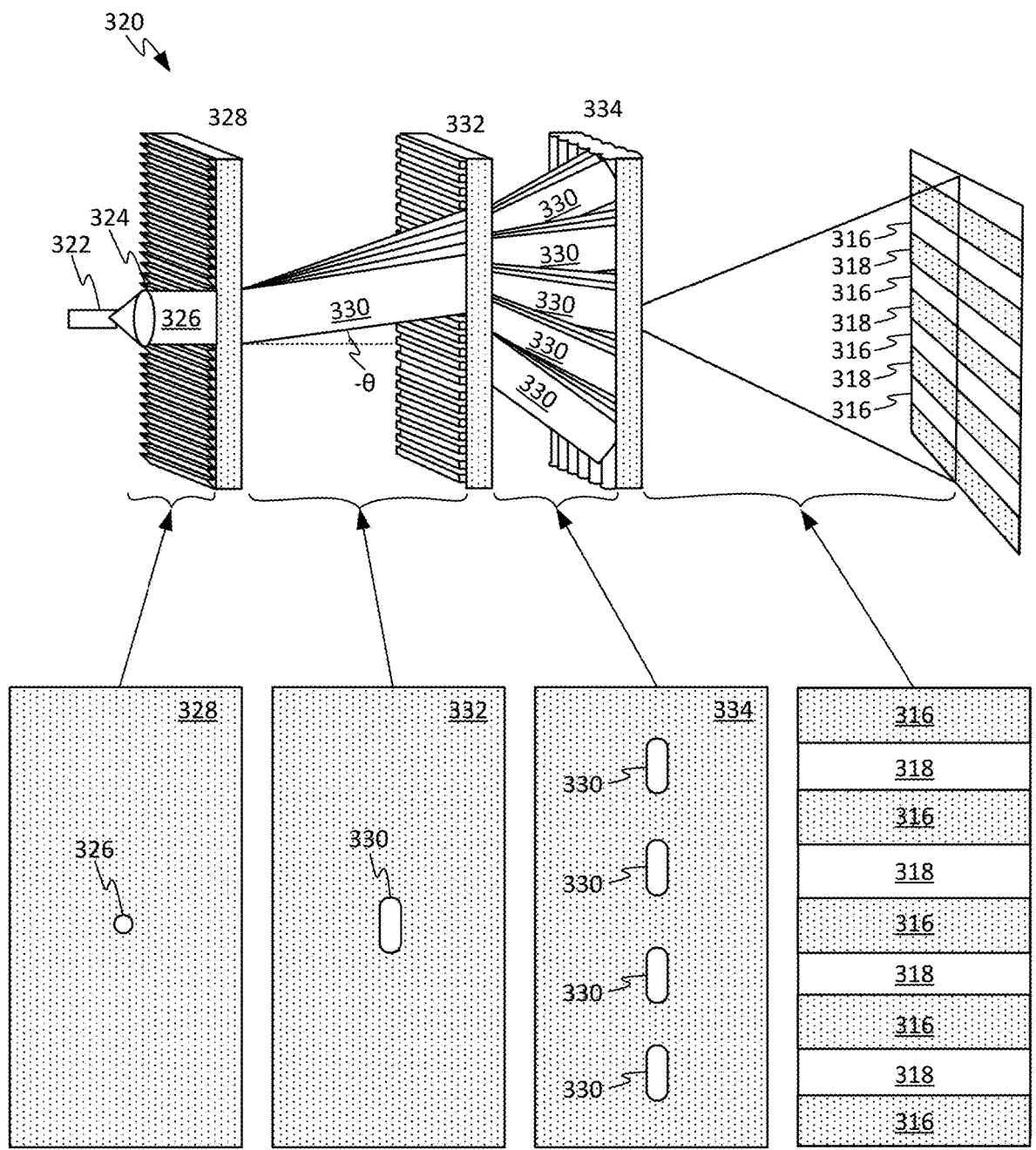

FIG. 3B shows a second optics assembly 320, which is made up of a group of light shaping components positioned in front of a light source 322. In some embodiments, light source 322 can be an infrared laser diode. Light source 322 emits light that passes through a first light shaping component, collimating lens 324. Collimating lens 324 can be configured to focus light 326 emitted by light source 322 towards a second light shaping component, refractive optical element 328. Refractive optical element 328 tilts focused light 326 by an angle −θ and elongates the light vertically to generate a super-gaussian beam 330 that is directed at a third light shaping component, diffractive optical element 332. In some embodiments, orienting supper Gaussian beam 330 in a direction opposite from the direction of super-gaussian beam 310 can reduce a risk of cross-talk between the light sources. Diffractive optical element 332 then multiplies the super-gaussian beam 330. While super-gaussian beam 330 is depicted for illustrative purposes as being multiplied five times, this number can vary. For example, in some embodiments, diffractive optical element 312 can be configured to multiply the super-gaussian beam 25 times. The number and thickness of multiplied super-gaussian beams 330 can be selected to match the vertical field of view of an associated imaging sensor. When super-gaussian beams pass through micro-lens array 334, micro-lens array 334 spreads each super-gaussian beam horizontally to create an illumination pattern that illuminates regions 318, as depicted. In this way, light sources 322 and 302 can cooperatively illuminate regions 316 and 318. Illumination of regions 316 and 318 can be staggered in different patterns. For example, regions 316 and 318 can be sequentially illuminated so that light shines in both regions for about the same amount of time.

Figure 3C:
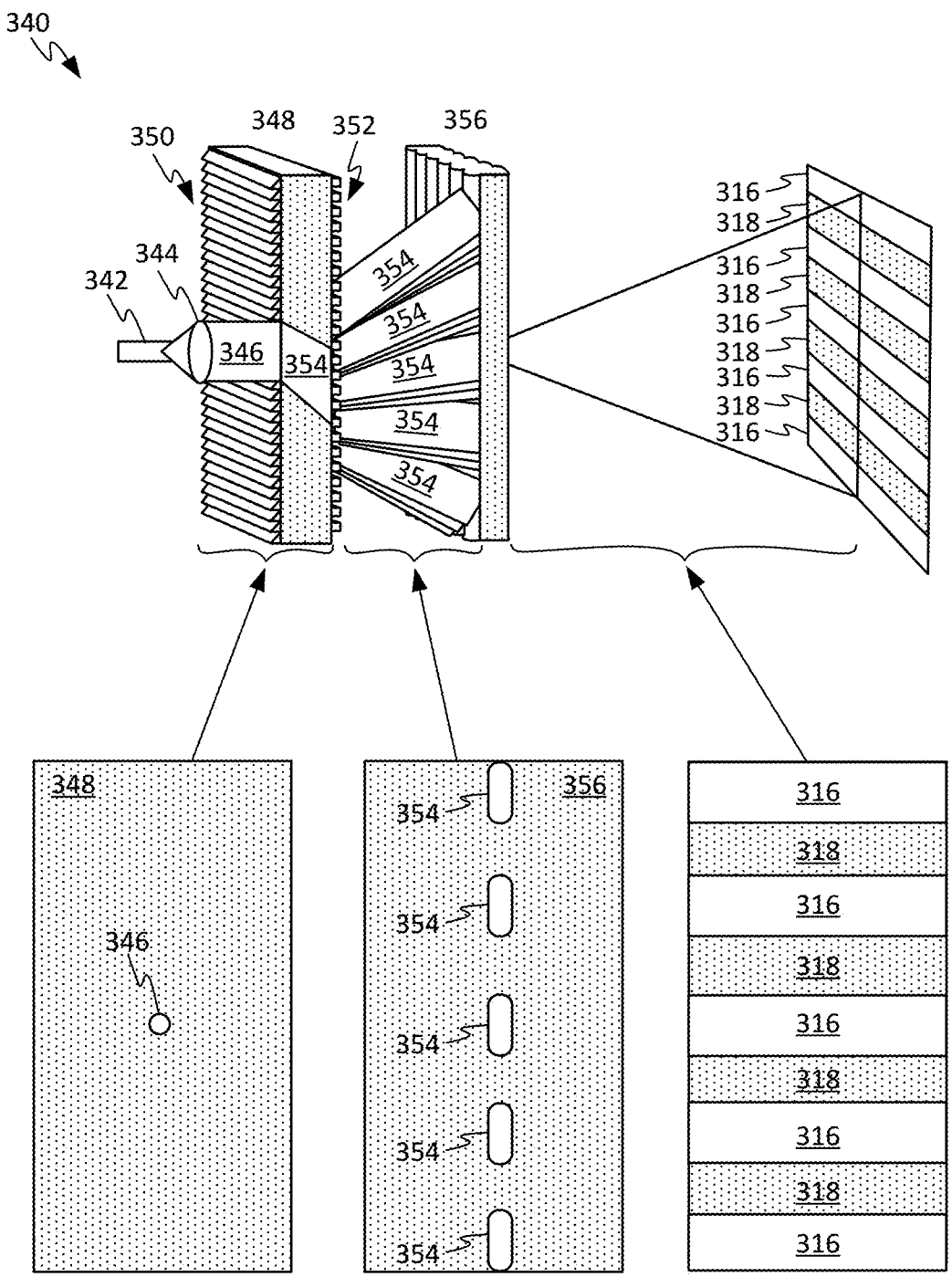

FIG. 3C shows another optics assembly 340, which is made up of three light shaping component positioned in front of a light source 342. In some embodiments, light source 342 can be an infrared laser diode. Light source 342 emits light that passes through a first light shaping component taking the form of collimating lens 344. Collimating lens 344 can be configured to collimate light 346 emitted by light source 342 travelling toward a second light shaping component taking the form of optical element 348. Optical element 348 can include both a refractive surface 350 on a first side of optical element 348 and a diffractive surface 352 on a second side of optical element 348. Refractive surfaces 350 and diffractive surfaces 352 can take the form of polymer material molded onto opposing sides of a glass or polycarbonate substrate. When collimated light 336 passes through refractive surface 340, the light is tilted by an angle θ and elongated into a super-gaussian beam 354 within optical element 348. When the super-gaussian beam 354 passes through diffractive surface 352, the super-gaussian beam 354 can be multiplied into multiple super-gaussian beams 354. When super-gaussian beams 354 pass through micro-lens array 356, micro-lens array 356 spreads each super-gaussian beam 354 horizontally to create an illumination pattern that illuminates regions 316, as depicted. In this way, light source 342 illuminates regions 316.

Figure 4A:
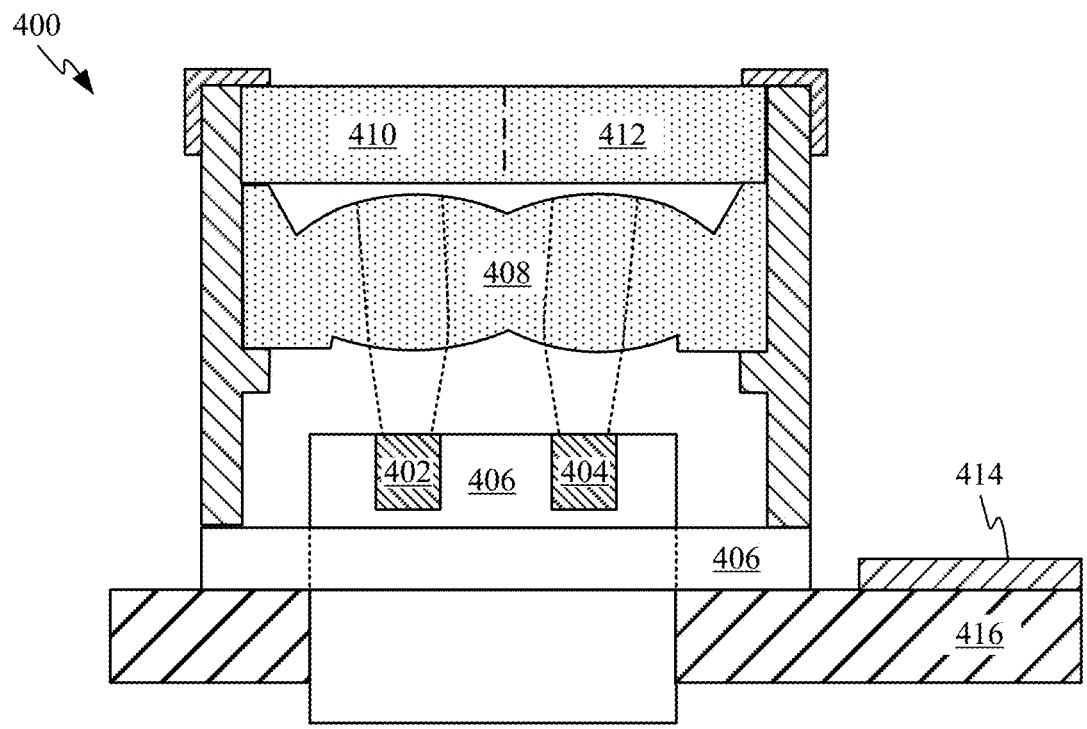
FIGS. 4A-4B show a projector assembly with two light sources that incorporates an optics assemblies for each light source similar to the optics assembly depicted in FIG. 3 according to some embodiments.
Figure 4B:
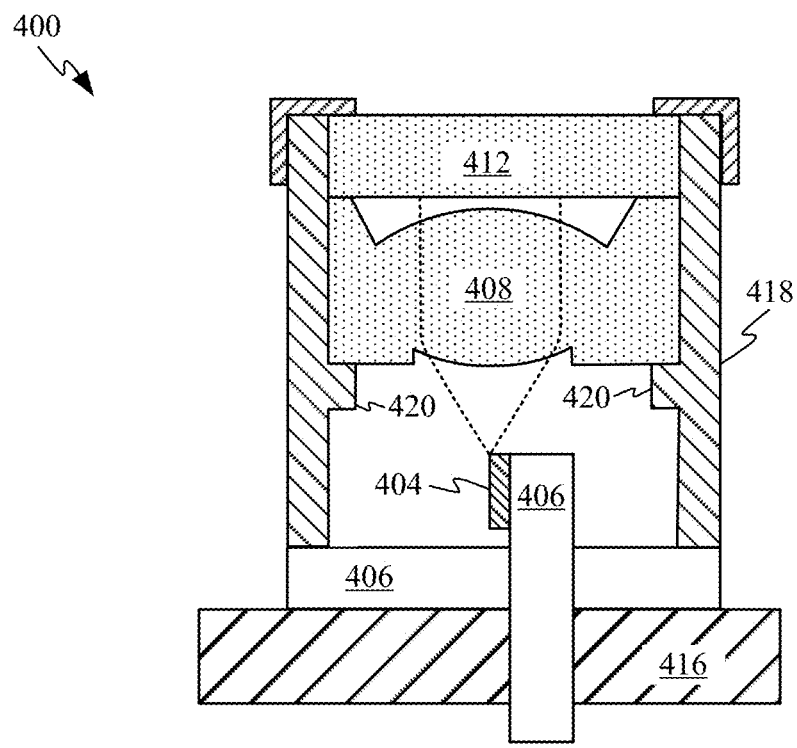

FIGS. 4A-4B show a projector assembly 400 with two light sources that incorporates an optics assemblies for each light source similar to optics assembly 300. FIG. 4A shows a top view of projection assembly 400. Projection assembly 400 includes light sources 402 and 404. Light sources 402 and 404 can both be mounted to rigid substrate 406. In some embodiments, rigid substrate 406 can be formed from an alumina ceramic. Rigid substrate 406 keeps light sources 402 and 404 from shifting position relative to one another. Rigid substrate 406 can also have a low coefficient of thermal expansion that reduces shifting of light sources 402 and 404 with respect to the optics assemblies.

Light source 402 shines light through a first portion of dual collimating lens 408, which focuses the light towards optics assembly 410. A second portion of dual collimating lens 408 focuses light emitted by light source 404 towards optics assembly 412. In some embodiments, dual collimating lens 408 can be replaced by two separate collimating lenses that accomplish the same function. Optics assembly 410 and 412 can each include a refractive optical element similar to 308, a diffractive optical element similar to 312 and a micro-lens array similar to 314 for spreading the light from each light source in an illumination pattern. Optics assembly 410 can be slightly different from optics assembly 412, making the illumination pattern generated by light source 404 vertically offset from the illumination pattern generated by light source 402 so that the illumination patterns are complementary. This allows the light bars from one illumination pattern to be positioned between the light bars of the other illumination pattern. In this way, the illumination patterns generated by light sources 402 and 404 cooperate to uniformly cover a surface. In some embodiments, the refractive optical element can shift light from light source 404 in an opposite direction from the light generated by light source 402.

Projector assembly 400 can also include a processor 414 mounted on PCB 416 and configured to synchronize output from light sources 402 and 404. For example, processor 414 can be mounted to PCB 416 and configured to direct light sources 402 and 404 to send out staggered pulses of light, so that neither illumination pattern is active at the same time. Processor 414 can also direct modulation of light sources 404 to help the depth sensor distinguish the pulses of light from other ambient light sources. In some embodiments, processor 414 can also be in communication with a sensor configured to receive the pulses of light after being reflected off objects within the sensor's field of view.

FIG. 4B shows a side view of projection assembly 400. In particular, light source 404 is shown elevated by rigid substrate 406. Rigid substrate can be inserted into a notch defined by PCB 416. Rigid substrate 406 can also form a base for projector housing 418 of projector assembly 400. Projector housing 418 can define a ledge 420 for supporting dual collimating lens 408.

Figure 5A:
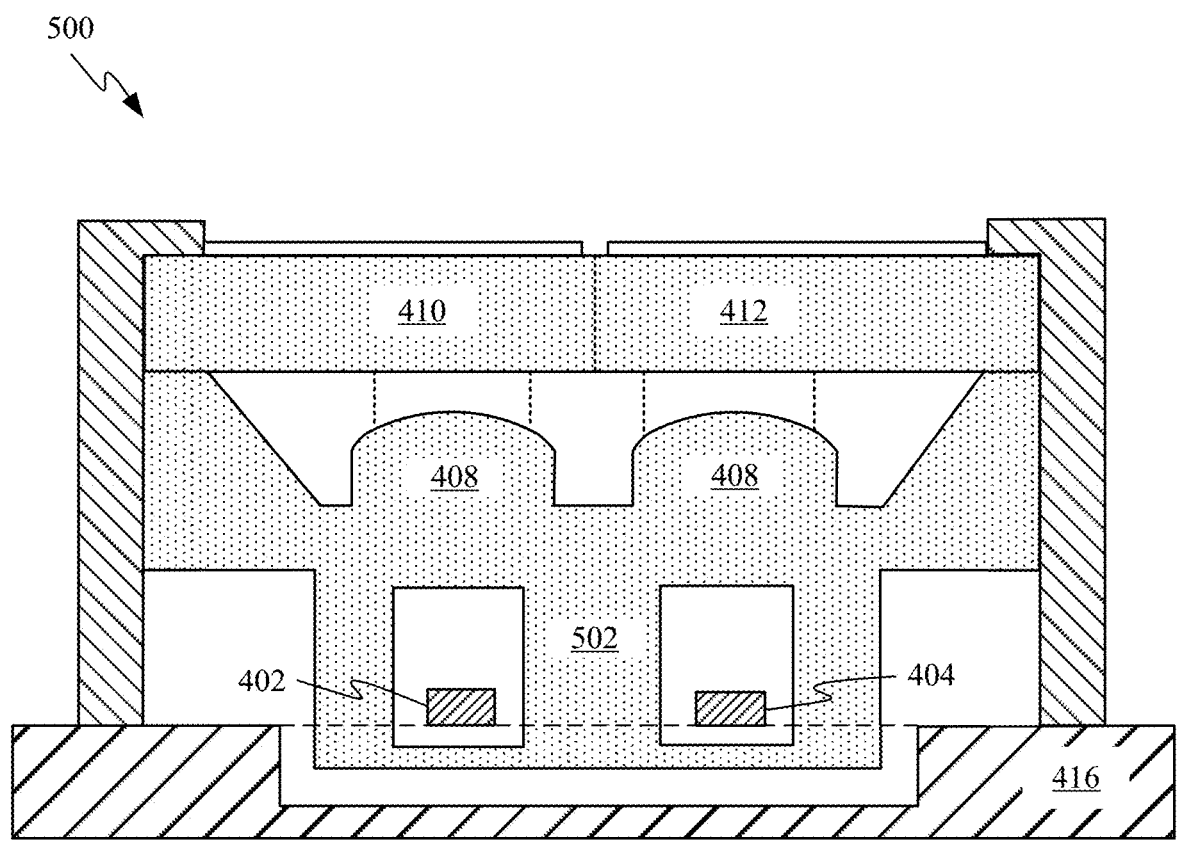
FIGS. 5A-5C show views of a multiple light source projector assembly utilizing folded optics according to some embodiments.
Figure 5B:
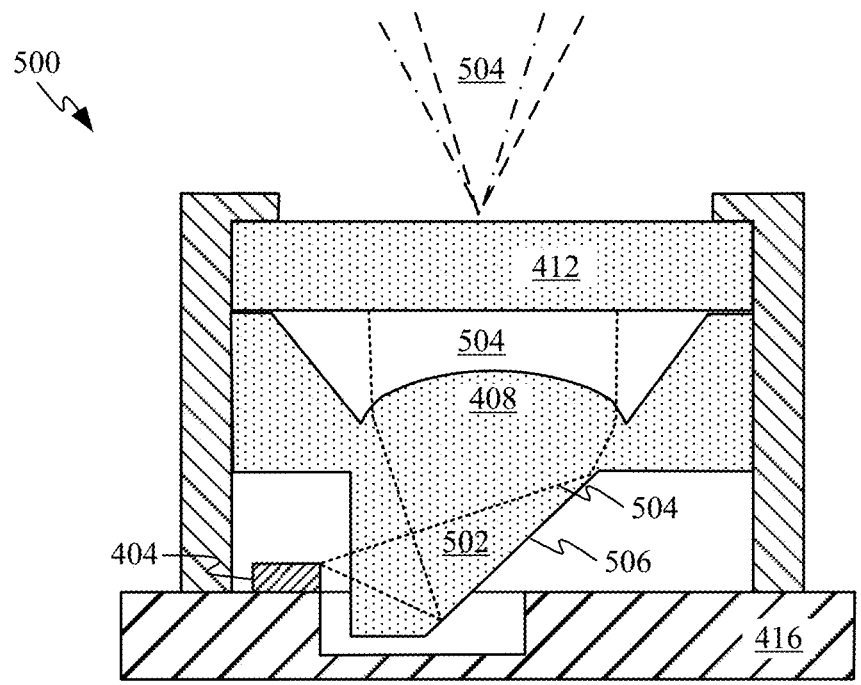

FIGS. 5A-5B show views of a multiple light source projector assembly 500 utilizing folded optics. FIG. 5A shows how projector assembly 500 includes two separate sets of optics, optics assemblies 410 and 412, which receive emitted light from folded optics 502 of collimating lens 408. Folded optics 502 allows light sources 402 and 404 to be positioned closer to collimating lens 408 by shifting light path 504 laterally, thereby allowing an overall reduction in the height of projector assembly 500.

Figure 5C:
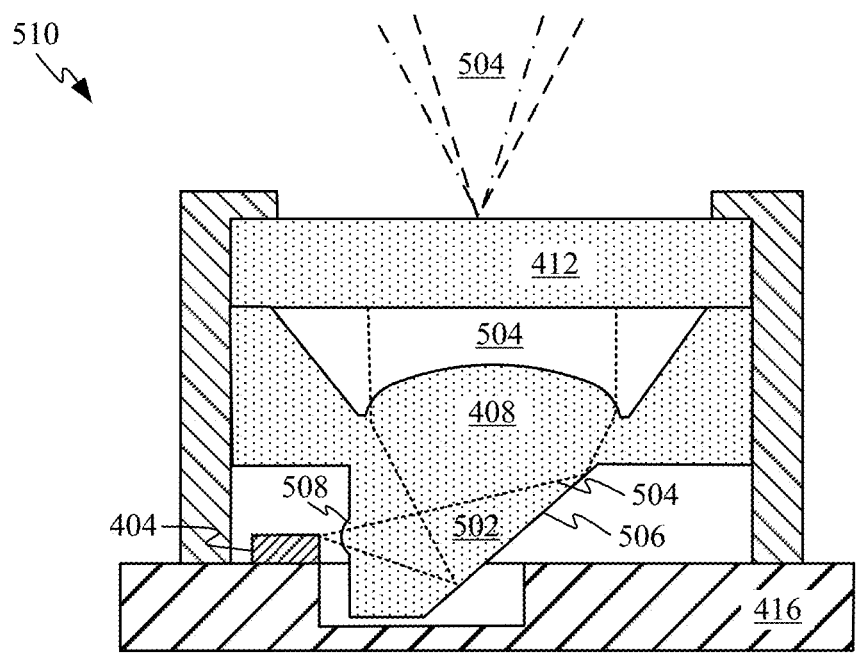
Figure 6A:
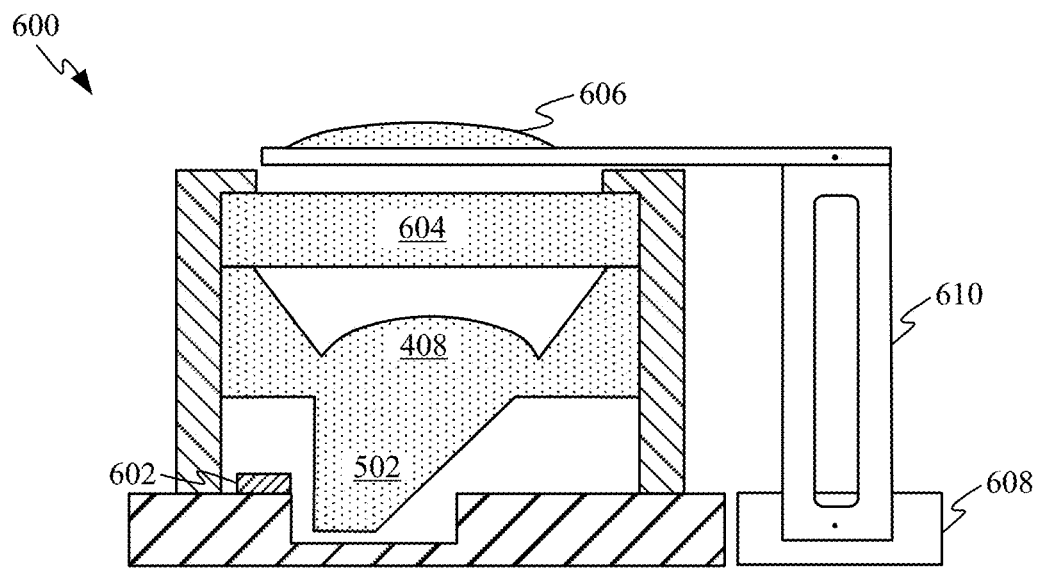
FIGS. 6A-6B show side views of a projection assembly using a single light source according to some embodiments.
Figure 6B:
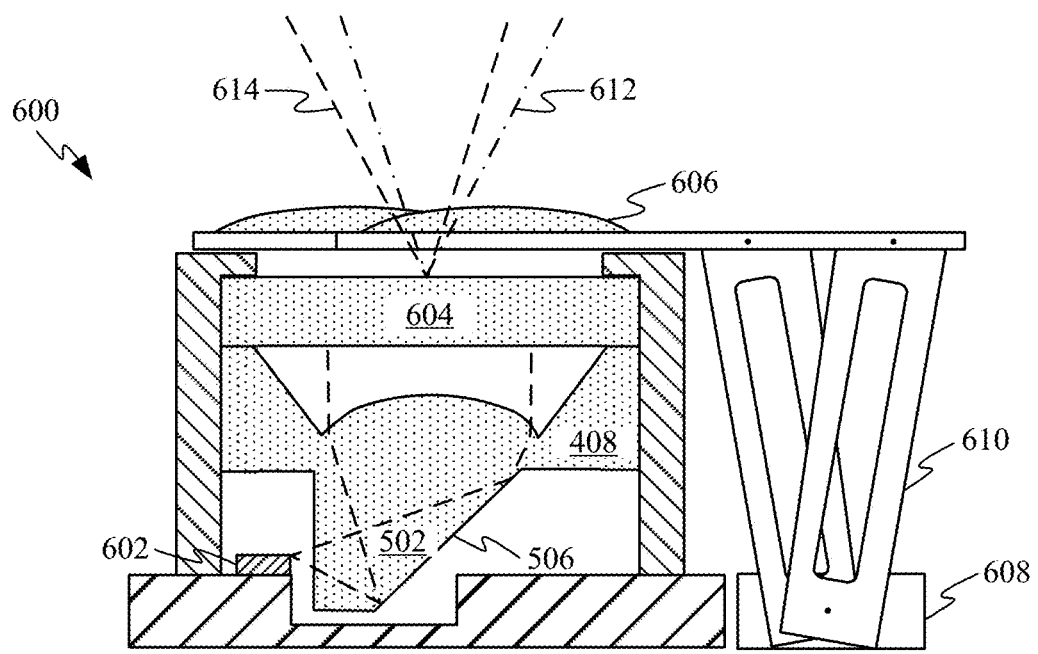

FIG. 5B shows how by shifting light path 504 laterally, the height of projector assembly 500 can be reduced, thereby allowing projector assembly 500 to be packaged within a smaller form-factor device. In particular, the laterally shifted light path 504 allows a length of the light path to be split into horizontal and vertical segments. The overall height of projector assembly 500 is reduced since the portion of the light path within the horizontal segment does not need to be incorporated within the overall height of projector assembly 500. A direction of the light path through folded optics 502 is redirected by optically reflective surface 506, which reorients the light from a horizontal orientation to a vertical orientation. In some embodiments, optically reflective surface 506 can be mirrored to FIG. 5C shows projector assembly 510, which can have a shorter overall height than projector assembly 500. Collimating lens 408 can include both folding optics 502 and cylindrical lens surface 508. Cylindrical lens surface 508 can partially collimate the light emitted by light source 404 by narrowing the width of the light entering collimating lens 408. Folded optics 502 can be shorter vertically due to the narrowed beam width of the light emitted by light source 404. The light then becomes fully collimated upon exiting collimating lens 408. In this way, a height of collimating lens 408 can be reduced FIGS. 6A-6B show side views of a projection assembly 600 using a single light source 602. FIG. 6A shows projection assembly 600 in an inactive configuration. Because projection assembly 600 only includes a single light source 602, in order to create two different illumination patterns projection assembly 600 includes a linearly actuated optics 606 configured to generate two complementary illumination patterns. Optics 606 can be linearly actuated by piezo-electric motor 608, which actuates optic 606 between two or more positions by rotating linkage 610 two positions shown in FIG. 6B. Piezo-electric motor 608 can be configured to oscillate optic 606 back and forth at a rate allowing light source 602 to sequentially project complementary illumination patterns 612 and 614. Light source 602 can be synchronized with the oscillation rate of optic 606 so that light source 602 emits light only when optic 606 is in a position corresponding to one of the complementary illumination patterns. It should be noted that while only two illumination patterns are shown that piezo-electric motor 608 can also be configured to define three or more different illumination patterns.

Figure 7:
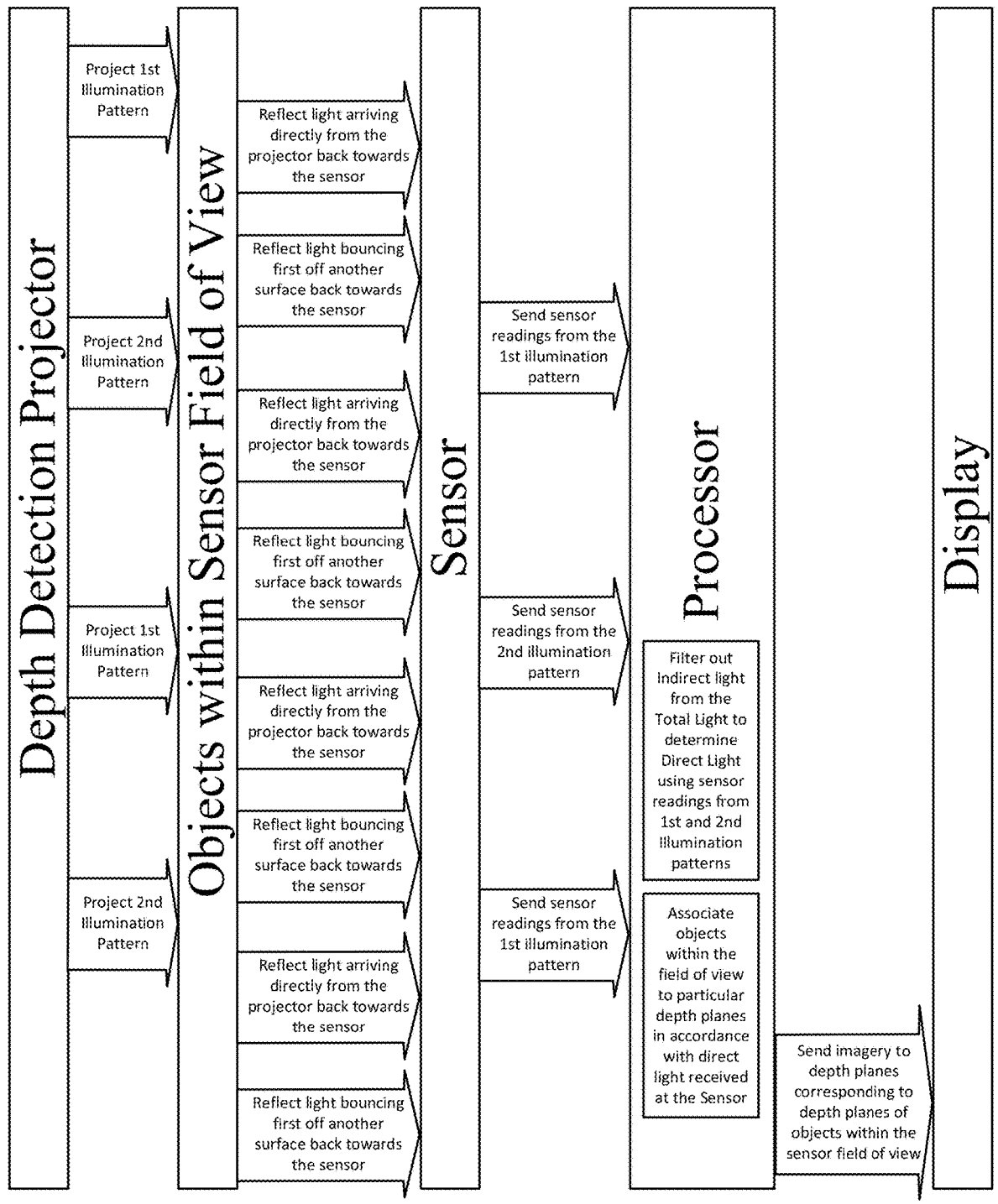
FIG. 7 shows a diagram depicting interaction between different components of the aforementioned depth detection system according to some embodiments.

FIG. 7 shows a diagram depicting interaction between different components of the depth detection system described above. The top of the flow chart indicates the beginning of the interaction and progresses on moving down the flow chart. A projector of a depth detection system sends out alternating first and second illumination patterns. Objects within a sensor field of view of the depth detection system reflect portions of the first and second illumination patterns back into the sensor of the depth detection system. The light travelling directly from the projector to the object and back (direct light) will arrive back at the sensor before light bouncing off another surface prior to returning to the sensor (indirect light) does. Consequently, a time of flight depth detection system will incorrectly increase the distance of an object from the sensor when indirect light is considered. The sensor then sends the light received from the first and second illumination patterns to the processor. The processor can then be configured to filter out indirect light from the total light received so that only light that travels directly from the project to the object and back to the sensor is considered when determining the distance between the sensor and the objects within the sensor field of view. The processor can then assign the objects within the sensor field of view to appropriate depth planes of a display associated with the depth detection sensor. Finally, the processor can send imagery to depth planes corresponding to the various objects within the sensor field of view.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A depth detection system, comprising:
    a projection system, comprising:
        a projector housing having a rigid substrate,
        a first light source configured to emit light through a first plurality of light shaping components and produce a first illumination pattern, the first light source being mounted to the rigid substrate, and
        a second light source configured to emit light through a second plurality of light shaping components and produce a second illumination pattern complementary to the first illumination pattern, the second light source being mounted to the rigid substrate adjacent to the first light source;
    an imaging sensor proximate the projection system and configured to receive light emitted by the first and second light sources after being reflected off objects within a field of view of the imaging sensor; and
    a processor configured to calculate a distance between the depth detection system and the objects within the field of view of the imaging sensor by measuring an amount of time for light emitted by the first and second light sources to reflect off the objects within the field of view of the imaging sensor and return to the imaging sensor and by filtering out sensor readings associated with light reflected off surfaces outside the field of view of the imaging sensor.

2. The depth detection system as recited in claim 1, wherein the processor filters sensor readings associated with light reflected off surfaces outside of the field of view of the imaging sensor by identifying the light emitted by the first light source that reflects off areas within the field of view of the imaging sensor corresponding to the second illumination pattern.

3. The depth detection system as recited in claim 1, wherein the first and second illumination patterns comprise a series of parallel bars.

4. The depth detection system as recited in claim 1, wherein the first plurality of light shaping components comprises a collimating optical element, a refractive optical element, a diffractive optical element, and a micro-lens array.

5. A method of operating a depth detection system, the method comprising:
- emitting, by a first light source of a projection system of the depth detection system, light through a first plurality of light shaping components to produce a first illumination pattern, the first light source being mounted to a rigid substrate of the projection system;
- emitting, by a second light source of the projection system, light through a second plurality of light shaping components to produce a second illumination pattern complementary to the first illumination pattern, the second light source being mounted to the rigid substrate adjacent to the first light source;
- receiving, by an imaging sensor proximate the projection system, light emitted by the first and second light sources after being reflected off objects within a field of view of the imaging sensor; and
- calculating, by a processor of the depth detection system, a distance between the depth detection system and the objects within the field of view of the imaging sensor by measuring an amount of time for light emitted by the first and second light sources to reflect off the objects within the field of view of the imaging sensor and return to the imaging sensor and by filtering out sensor readings associated with light reflected off surfaces outside the field of view of the imaging sensor.

6. The method of operating the depth detection system as recited in claim 5, further comprising:
- filtering, by the processor of the depth detection system, sensor readings associated with light reflected off surfaces outside of the field of view of the imaging sensor by identifying the light emitted by the first light source that reflects off areas within the field of view of the imaging sensor corresponding to the second illumination pattern.

7. The method of operating the depth detection system as recited in claim 5, wherein the first and second illumination patterns comprise a series of parallel bars.

8. The method of operating the depth detection system as recited in claim 5, wherein the first plurality of light shaping components comprises a collimating optical element, a refractive optical element, a diffractive optical element, and a micro-lens array.

* * * * *